Figure 1:
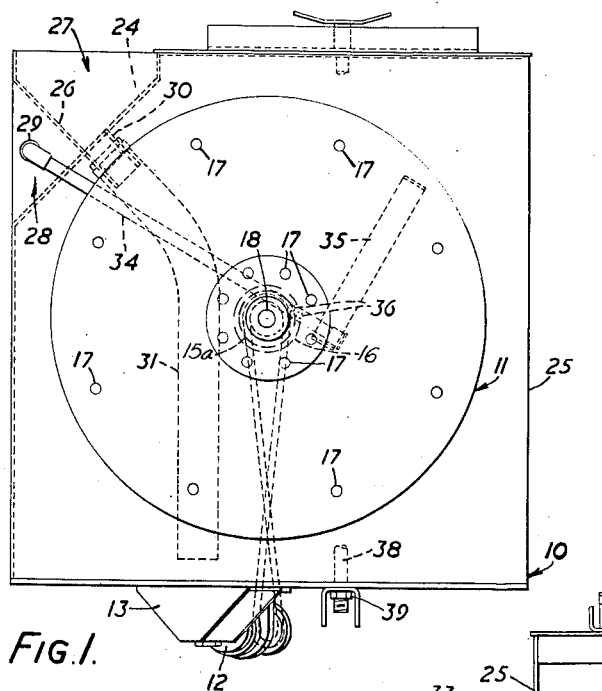

June 5, 1962     E. BALS     3,037,705

SPRAYING OF LIQUIDS

Filed Aug. 1, 1960     3 Sheets-Sheet 1

INVENTOR
EDWARD BALS

BY Irwin S. Thompson

ATTORNEY

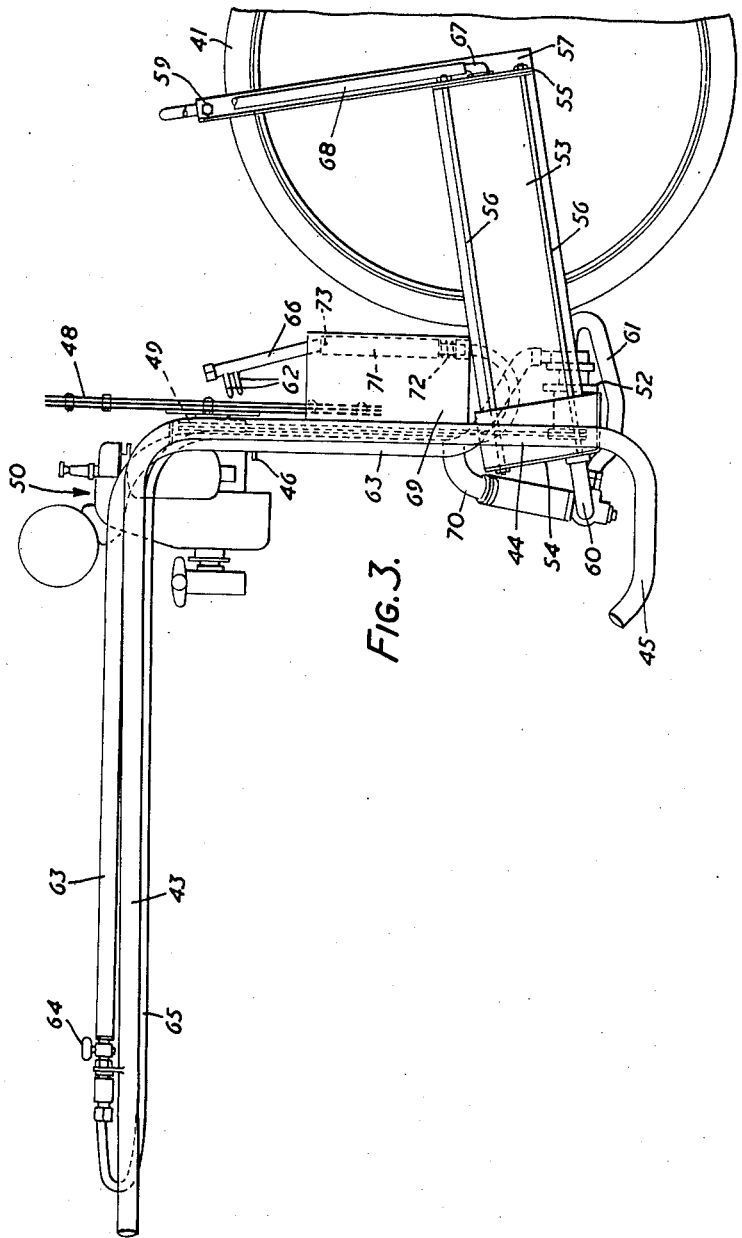

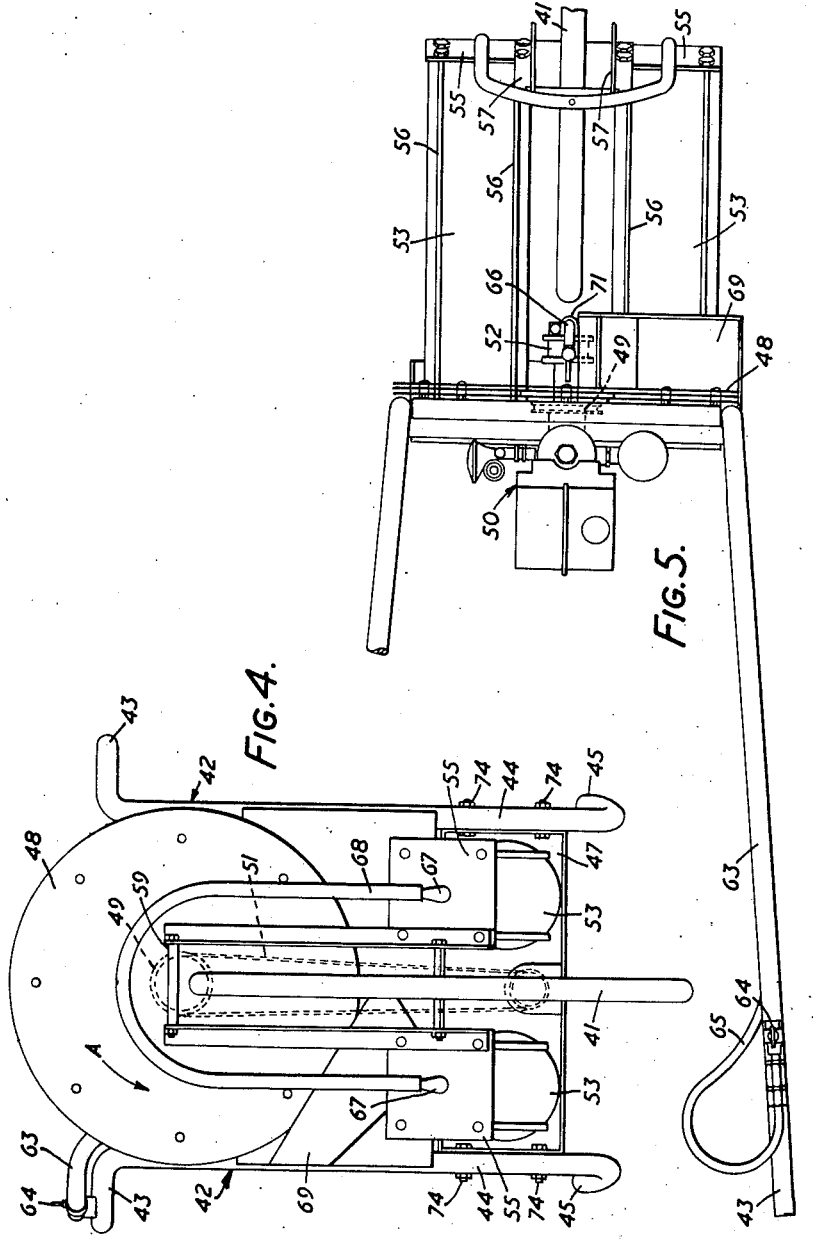

3,037,705
SPRAYING OF LIQUIDS
Edward Bals, Pedmore, near Stourbridge, England, assignor to Birfield Engineering Limited, London, England
Filed Aug. 1, 1960, Ser. No. 46,419
Claims priority, application Great Britain July 30, 1959
7 Claims. (Cl. 239—77)

This invention relates to the spraying of liquids, and in particular to spraying equipment and a method of spraying suitable for use with standing crops and the like.

Crop-spraying equipment has come into general use in which an axial flow impeller produces a stream of air which is constrained to flow along a duct into which is fed the liquid to be sprayed. The liquid is in some cases sprayed into the duct by a rotary atomizer positioned in the duct and driven by the air stream which picks up the liquid so that an axially moving rod-like volume of finely divided particles is produced which is directed on to the crops to be sprayed.

The equipment has to be small enough to transport amongst or alongside the growing crops and hence a small high speed impeller with fairly high power requirements is normally used. Thus when the equipment has a self-contained power unit most of the output of the latter is absorbed by the impeller, and when the equipment is designed for transport on the back of an operator a considerable portion of the weight to be borne is accounted for by the power unit.

The object of the invention is to provide spraying equipment and a method of spraying which, for a particular application, can be designed to have much smaller power requirements than equipment at present in use.

According to the invention spraying equipment comprises a rotary atomizer unshrouded around at least a major portion of its periphery, means for supplying to the atomizer a liquid to be sprayed, and drive means for rotating the atomizer independently of the air flow past the latter to produce a disc-like curtain of finely divided particles of the liquid which extends transversely of the rotational axis of the atomizer.

In use the atomized curtain of liquid may be allowed to drift on to standing crops under the influence of a prevailing wind or the atomizer may be traversed in its axial direction amongst or alongside the crops so that the curtain progressively treats the latter.

In certain circumstances, described hereinafter, the atomizer may have associated therewith a collector scoop arranged to intercept and collect particles of liquid sprayed by the atomizer in predetermined directions. If a vertical curtain is produced the scoop may be located to prevent liquid being sprayed directly at the ground or on to the equipment.

The atomizer preferably comprises a plurality of closely spaced discs to a central region of which the liquid is fed so that it passes centrifugally outwardly between the discs which are mounted on a rotatable shaft. The liquid leaves the peripheries of the discs as finely divided particles.

The construction of the atomizer is preferably such that it creates a current of air which assists centrifugal force in dispersing the atomized liquid outwardly to form said curtain. The draught produced is solely for the purpose of producing the aforesaid curtain of atomized liquid, and its purpose is not to produce any movement of the curtain axially of the atomizer.

The invention also includes a method of spraying a liquid comprising the steps of producing a disc-like curtain of finely divided particles of the liquid by rotary atomization and continuously moving the rotary source producing the curtain axially of the curtain it is producing.

The invention will now be described by way of example with reference to the accompanying drawings, in which:

FIGURE 1 is an end elevation of a vineyard sprayer embodying the invention,

FIGURE 2 is a side elevation of the sprayer of FIGURE 1,

FIGURE 3 is a side elevation of a tomato sprayer embodying the invention,

FIGURE 4 is an end elevation of the sprayer of FIGURE 3, and

FIGURE 5 is a plan view of the sprayer of FIGURES 3 and 4.

Referring now to FIGURES 1 and 2, the sprayer there shown comprises a rectangular tank 10 for liquid to be sprayer, a disc atomizer indicated generally at 11 and a centrifugal pump 12 which draws liquid from a well 13 formed in the bottom of the tank 10 and delivers the liquid to the atomizer 11. The atomizer consists of three discs 14, 15 and 16 held in closely spaced relation by two rows of bolts 17, the discs being spaced by spacing washers surrounding the bolts. The disc 14 is a backing disc and is secured by means of a hub **14*a* to one end of a shaft 18 which passes through the tank 10 and is supported by bearings 19 secured to the outer surfaces of the tank walls. The other end of the shaft carries a pulley 20 around which is entrained a belt 21; the belt is also entrained around a pulley 22 secured to the shaft of the centrifugal pump 12 whereby the pump is driven from the shaft 18. The shaft 18 also carries a double pulley 23 by which the shaft 18** may be driven, for example, from the power take-off of a tractor.

One upper corner of the tank 10 is closed by an inclined baffle 24 extending between side walls 25 of the tank. A further inclined baffle 26 (see FIGURE 1) extends between the side walls 25 and is secured to the baffle 24. The baffles 24 and 26 define a filling funnel 27 for the tank above the baffle 26 and define a wedge shaped space 28 below the baffle 26. A pipe 29 passes transversely across the space 28 and provides a lifting handle for the sprayer. The filling funnel 27 is continued downwardly by a pipe 30 to which is secured the upper end of a filling pipe 31 whose lower end is located adjacent to the bottom of the tank; a breather (not shown) is provided in the tank. The pipe 29 forms part of the path for liquid between the pump 12 and the atomizer 11; liquid leaves the pump 12 through a flexible pipe 32 and then passes through a tap 33 into the pipe 29. From the pipe 29 the liquid passes into a nozzle pipe 34 which is rotatably mounted on an extension of the pipe 29. A nozzle pipe support 35 is secured to a side wall 25 and the pipe 34 is forced against the support 35 by a spring **35*a***.

The nozzle pipe 34 carries two nozzles 36 at its free end and, when the pipe 34 is in its operative position as shown in the figures, the nozzles 36 are located to spray liquid into holes **15*a* and 16*a* provided in the centres of the discs 15 and 16 respectively. These holes are large enough for there to be considerable clearance around the shaft 18 and the hole 16*a* in the disc 16 is somewhat larger than the hole 15*a* in the disc 15**.

The tank 10 is provided with a lid 37 which is releasably held in position by a bolt 38 passing through the tank 10 and having a nut 39 at the bottom and a wing-nut 40 at the top.

The operation of the sprayer is as follows: the tank is mounted on the rear of a tractor so that the shaft 18 is parallel to the direction of movement of the tractor and the pulley 23 is driven from the power take-off of the tractor thus rotating the atomizer 11 and driving the pump 12. Liquid is drawn by the pump 12 from the tank 10 and is discharged through the pipe 32, the tap 33, the pipe 29 and the pipe 34 to the nozzles 36. The nozzles discharge the liquid into the holes 15a and 16a in the discs 15 and 16 and the liquid passes centrifugally outwardly between the discs to be discharged from the edges thereof as finely divided particles which form a disc-like curtain transverse to the direction of motion of the tractor. The nozzles are located so that some of the liquid impinges on the backing plate 14 and passes outwardly between the plates 14 and 15 while the remainder of the liquid impinges on the plate 15 around its central hole 15a and passes outwardly between the discs 15 and 16. The tractor is moved between the rows of plants to be sprayed, in this case vines, and the curtain of particles impinges on the plants. Advantage may be taken of a wind to leave the tractor stationary and to produce a cloud of particles which is blown over the plants by the wind.

The liquid supply to the atomizer may be shut off by operation of the tap 33. When it is desired to clean the nozzles 36, the pipe 34, after having been pushed away from the support 35 against the spring 35a, may be swung away from the shaft 18 to bring the nozzles 36 into accessible portions for cleaning.

When a sprayer is used between narrowly spaced rows of plants and the atomizer is positioned comparatively far from the ground, the proportion of the disc-like curtain of particles produced which is sprayed directly at the ground is comparatively small. When, however, the atomizer is placed close to the ground this proportion increases and it becomes desirable to insert a collector scoop under a portion of the atomizer to intercept those particles directed at the ground and at any parts of the sprayer directly under the atomizer. An embodiment of a sprayer including such a collector scoop will now be described with reference to FIGURES 3 to 5.

Referring now to FIGURES 3 to 5 a framework mounted at its rear end on a single bicycle type wheel 41 comprises two generally L shaped tubular frame members 42 each having an upper forwardly directed limb 43 forming a handle and a substantially vertical limb 44 forming a leg turned at its lower end to provide a foot 45 on which the equipment is supported when not in use.

Figure 2:
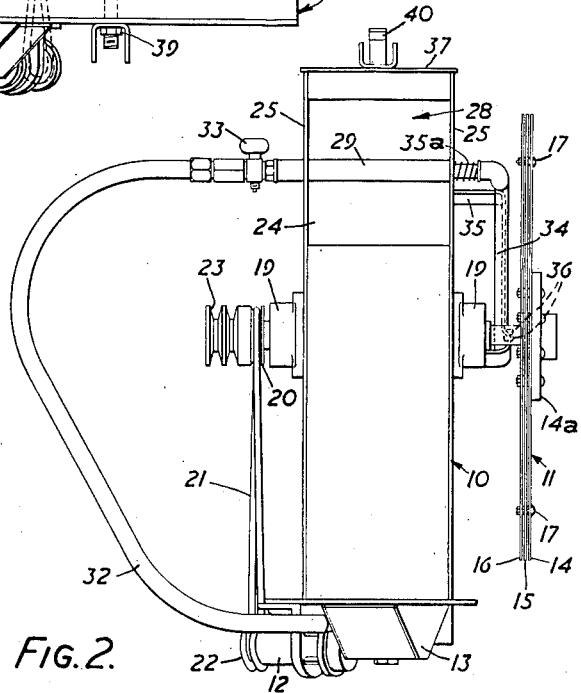

The tubular frame members 42 are spaced apart laterally of the equipment with their legs 44 connected together by two spaced cross members 46, 47. An atomizer 48 and a pulley 49 are mounted on the crankshaft of a small two-stroke petrol engine 50 secured to the upper cross member 46. A belt 51 entrained round the pulley 49 drives a supply pump 52 mounted on the lower cross member 47. The atomizer 48 comprises three axially and closely spaced annular discs and is similar to the atomizer described in relation to FIGURES 1 and 2.

Two liquid supply tanks 53 of cylindrical shape are built into the framework and together provide a fork between which the wheel 41 is fixed. The lower cross member 47 has an inclined portion 54 which forms a common end plate for the front ends of the tanks which, at their rear ends, are provided with individual end plates 55. The end plates of each tank are clamped together by four rods 56 having threaded ends and nuts and which extend between the plates adjacent to the outside surfaces of the tanks 53. The rear end plates 55 support upwardly extending angle members 57 between which the hub 58 of the wheel 41 is bolted. The angle members extend upwardly above the wheel 41 and their upper ends are connected together by a bolt 59.

All connections to the tanks are through the end plates. Outlets 60 are provided at the fronts of the tanks 53 and are connected together to the input of the pump by a flexible pipe 61. The output of the pump is fed to nozzles 62 supplying central regions of the discs of the atomizer 48. The output of the pump 52 passes along a flexible pipe 63 to a valve 64 on one of the limbs 43 and from the valve 64 along a further flexible pipe 65 to the bottom of a nozzle tube 66. The pump has a low delivery pressure to allow the nozzles to be of a large size so that they do not clog easily. To ensure complete emptying of the tanks even when the equipment is being towed up a steep slope, the tanks are arranged with a downward and forward inclination of about 10° to the horizontal. In each back end plate 55 is provided an upwardly extending pipe elbow 67. The elbows 67 are connected by a flexible pipe 68 which is led over the top of the wheel arch constituted by the members 57 and the bolt 59. An aperture is provided in the upper arm of the pipe 68 whereby the pressures in both tanks 53 are equalised at atmosphere pressure.

The atomizer is generally unshrouded but a collector scoop 69 is provided which embraces the lower quarter of one side of the atomizer 48 to prevent wastage of spray on the ground and to protect the machine from the action of any corrective liquid which may be sprayed. The scoop 69 is of a trapezoidal form with a return connection to the tanks and is of sufficient depth and width to prevent overflowing and to allow air to separate from the liquid; a gauze filter (not shown) is mounted in the scoop. The return connection from the scoop comprises a pipe 70 secured to the bottom of the scoop and leading to the tank outlets 60. This arrangement allows the collector scoop to be used for filling the tanks 53, fresh liquid being poured into the scoop until it will no longer drain away from the scoop into the tanks. During filling, air escapes from the tanks through the aperture in the pipe 68.

The atomizer 48 is arranged between the wheel 41 and the tubular frame members 42 rearwardly of the engine 50 and two nozzles 62 are provided to supply liquid to the atomizer. The nozzles 62 are mounted at the top of the tube 66 which is carried in a sleeve 71 welded to the collector scoop and is free to slide in the sleeve. The pipe 66 is spring loaded downwardly by a spring 72 and is located in the sleeve by a cross pin 73 which fits in a notch at the top of the sleeve. This enables the tube 66 to be lifted against the spring 72 until the cross pin 73 has cleared its notch, whereupon the pipe 66 may be turned to allow access to the jets should the latter require clearing.

The tubular frame members 42 are spaced further apart than the width of the atomizer and engine to afford protection for these parts, and the limbs 43 are splayed out to accommodate between their forward ends an operator who tows the equipment between rows of crops to be sprayed. At each end the lower cross member 47 is bolted by bolts 74 to the frame members 42 and, for packing and transporting, the bolts 74 can be released and the frame members reversed to bring the limbs 43 and power unit 50 over the wheel to provide a very compact arrangement. As a result of the arrangement and inclination of the tanks effective agitation of the liquid therein is obtained when the operator lowers the machine to its rest position and then picks it up again. In operation the sprayer of FIGURES 3 to 5 is generally similar to the sprayer of FIGURES 1 and 2. The atomizer produces a curtain of droplets which is not a continuous disc due to the provision of the collector scoop. The atomizer rotates in the direction of the arrow "A" in FIGURE 4 and the collector scoop is so positioned as to intercept and collect those particles of liquid which would otherwise be sprayed directly at the ground and on to those parts of the sprayer lying directly under the machine. The machine is towed up and down the rows between the plants by an operator and the curtain of particles formed falls on the plants.

Liquid is drawn from the tanks 53 by the pump 52, passes through the pipe 63, the valve 64, the pipes 65 and 66 to the nozzles 62. The liquid enters the holes in the atomizer discs and leaves their peripheries in the form of fine particles. Any liquid collected in the scoop 69 flows through the pipe 70 back to the tanks 53. The operator can control the feed of liquid to the atomizer by means of the valve 64 so that no liquid need be sprayed while the operator wheels the equipment around the ends of rows.

In both atomizers described, the liquid flowing centrifugally outwardly between the discs entrains air which assists centrifugal force in dispersing the atomized liquid outwardly to form said curtain.

Although the invention has been specifically described with reference to equipment movable on vehicles, the equipment could be designed to be carried on the back of an operator and may comprise a geared drive powered by a handle positioned for turning by the operator. As the main power requirement for the equipment is for driving the atomizer, no separate impeller being provided, the equipment can conveniently be constructed for manual operation.

I claim:

1. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs having apertures at their centres for the introduction of liquid to be atomized between each two adjacent discs; a liquid supply tank through which said shaft passes; a pump to draw liquid from the tank and to deliver it to the apertures at the centres of the discs; valve means between the pump and the atomizer to control the delivery of liquid from the pump to the atomizer; means for directing liquid supplied by the pump to the apertures in the centres of the discs; drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point within at least a major portion of the atomizer periphery leaves the equipment without being intercepted by parts thereof whereby the spray produced by the equipment is in the form of a curtain of liquid particles extending generally parallel to the planes of the discs.

2. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs having apertures at their centres for the introduction of liquid to be atomized between each two adjacent discs; a liquid supply tank; an inclined apertured baffle which closes one corner of said tank; a second inclined baffle which forms with said first baffle a funnel for filling the tank; a pump to draw liquid from the tank and to deliver it to the apertures at the centres of the discs; valve means between the pump and the atomizer to control the delivery of liquid from the pump to the atomizer; means for directing liquid supplied by the pump to the apertures in the centres of the discs; drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point within at least a major portion of the atomizer periphery leaves the equipment without being intercepted by parts thereof whereby the spray produced by the equipment is in the form of a curtain of liquid particles extending generally parallel to the planes of the discs.

3. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs have apertures at their centres for the introduction of liquid to be atomized between each two adjacent discs; a liquid supply tank; an inclined apertured baffle which closes one corner of said tank; a second inclined baffle which forms with said first baffle a funnel for filling the tank, said inclined baffles also providing a wedge shaped space in a wall of said tank; a lifting handle which traverses said space; a pump to draw liquid from the tank and to deliver it to the apertures at the centres of the discs; valve means between the pump and the atomizer to control the delivery of liquid from the pump to the atomizer; means for directing liquid supplied by the pump to the apertures in the centres of the discs; drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point within at least a major portion of the atomizer periphery leaves the equipment without being intercepted by parts thereof whereby the spray produced by the equipment is in the form of a curtain of liquid particles extending generally parallel to the planes of the discs.

4. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs have apertures at their centres for the introduction of liquid to be atomized between each two adjacent discs; a liquid supply tank; an inclined apertured baffle which closes one corner of said tank; a second inclined baffle which forms with said first baffle a funnel for filling the tank, said inclined baffles also providing a wedge shaped space in a wall of said tank; means for directing liquid supplied by the pump to the apertures in the centres of the discs; a pipe forming part of said means for directing liquid to the disc apertures which traverses said space and forms a lifting handle for the tank; a pump to draw liquid from the tank and to deliver it to the apertures at the centres of the discs; valve means between the pump and the atomizer to control the delivery of liquid from the pump to the atomizer; drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point within at least a major portion of the atomizer periphery leaves the equipment without being intercepted by parts thereof whereby the spray produced by the equipment is in the form of a curtain of liquid particles extending generally parallel to the planes of the discs.

5. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs having apertures at their centres for the introduction of liquid to be atomized between each two adjacent discs; a collector scoop mounted on the equipment adjacent to a minor portion of the atomizer periphery; at least one liquid supply tank arranged beneath the scoop and from which liquid is drawn to supply the atomizer; means for supplying liquid to be atomized to the apertures at the centres of the discs including at least one nozzle arranged to direct liquid to a plurality of the spaces between the discs and a nozzle pipe for said nozzle and which can be moved to render the nozzle accessible for cleaning; means for returning liquid collected in the scoop to said tank; and drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point of the atomizer periphery lying outside said minor portion leaves the equipment without being intercepted by parts thereof so that the spray produced by the equipment is in the form of a curtain of liquid particles extending generally parallel to the planes of the discs, liquid leaving the atomizer periphery from points within said minor portion being intercepted by said collector scoop.

6. Spraying equipment according to claim 5, wherein the adjacent faces of the discs are smooth so that said passages between adjacent faces of the discs are substantially uninterrupted circumferentially and the liquid introduced between the adjacent discs flows uninterruptedly over the faces of the latter.

7. Spraying equipment comprising a shaft; a rotary atomizer including a plurality of parallel discs mounted on the shaft in closely spaced relation to provide centrifugally extending passages of substantially constant width between adjacent faces of the discs from adjacent the centres thereof to the disc peripheries, at least some of said discs having apertures at their centres for the introduction of liquid to be atomized between each two adjacent discs; a collector scoop mounted on the equipment adjacent to a minor portion of the atomizer periphery; at least one liquid supply tank arranged beneath the scoop and from which liquid is drawn to supply the atomizer; a nozzle pipe having at least one nozzle; locking means for said nozzle pipe enabling it to be locked in a position in which the nozzle directs liquid to the spaces between the discs and which can be released to allow the nozzle pipe to be moved to a position in which the nozzle is accessible for cleaning; means for returning liquid collected in the scoop to said tank; and drive means to rotate the atomizer to cause liquid supplied to the apertures to travel centrifugally outwardly along said passages and to leave the disc peripheries in the form of fine particles; the atomizer being mounted on the equipment in a location such that atomized liquid leaving the atomizer at any instant from any point of the atomizer periphery lying outside said minor portion leaves the equipment without being intercepted by parts thereof so that the spray produced by the equipment is in the form of a curtain of liquid particles extending generally parallel to the planes of the discs, liquid leaving the atomizer periphery from points within said minor portion being intercepted by said collector scoop.

References Cited in the file of this patent

UNITED STATES PATENTS

| | | |
|---|---|---|
| 809,046 | Collins | Jan. 2, 1906 |
| 1,022,956 | Lengerke et al. | Apr. 9, 1912 |
| 1,169,599 | Barker | Jan. 25, 1916 |
| 1,506,226 | Dick | Aug. 26, 1924 |
| 2,185,570 | Ridley | Jan. 2, 1940 |
| 2,607,575 | Hession | Aug. 19, 1952 |
| 2,878,058 | Gauthier et al. | Mar. 17, 1959 |

FOREIGN PATENTS

| | | |
|---|---|---|
| 1,048,066 | Germany | Dec. 31, 1958 |